Patented Mar. 18, 1941

2,235,556

UNITED STATES PATENT OFFICE 2,235,556

CALCIUM FERRITE PREPARATION

Harley C. Lee, Columbus, Ohio, assignor to Basic Dolomite, Inc., Cleveland, Ohio, a corporation of Ohio No Drawing. Application January 18, 1939, Serial No. 251,591

3 Claims. (Cl. 106—9)

Where dolomite is calcined together with mill scale, flue dust, and the like, as is customary in the preparation of dolomite refractory materials for furnace linings, etc., the dolomite particles undergo calcination and carbon dioxide is eliminated, and at the same time the iron oxide, as represented in the mill scale or the like, combines with lime available at the surface of the dolomite particles, and calcium ferrite is formed in situ. The calcined grains thus provided with more or less calcium ferrite, when subsequently placed as a furnace hearth or lining, are caused to in time consolidate together, under the furnace heat, as the fluxes soften and further maturation of the grains takes place. As the formation of the flux must depend upon the iron oxide reacting with such lime as it can abstract from the composite dolomite particles, and the latter are to that extent changed, such products are characterized by an undesirable lack of uniformity. In accordance with the present invention however, it now becomes possible to provide a more uniform and effective coating of calcium ferrite, and the result is a maximum of bonding or coalescing action without detriment to the refractory grain.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The refractory material to be treated, is crushed and screened to desired size. This varies somewhat, depending upon the particular duty intended. In usual conditions, it may be for instance ½ inch to 20 mesh. Since the refractory grain per se is not relied upon completely as a reaction component for the formation of the calcium ferrite binder, there may be some latitude of choice, and while dolomite is particularly advantageously available, other refractory materials such for instance as brucite, or mixtures, may be employed. These raw materials should be low in silica for instance under 2 per cent, since silica tends to impair or destroy the calcium ferrite.

I prepare calcium ferrite flux in suitable manner, and then apply it to the refractory material. The calcium ferrite flux is prepared by reacting lime and iron oxide together, these combining at temperatures between 1150 and 1425° C., depending upon the proportions and conditions. The calcium ferrite flux may be made for instance in a rotary kiln, or a sintering machine or in a hearth type furnace. The calcium ferrite prepared may be comminuted as convenient, and may be stored and handled in such form. While molten it can be particularly easily granulated, and it may be further ground if desired. Where operating conditions permit, the calcium ferrite in molten condition may be run into admixture and distribution in the refractory grains. Thus, the calcium ferrite may be fed into the refractory material at a suitable point or temperature range in the kiln. The amount of calcium ferrite employed depends somewhat upon the condition of the material to which it is applied, and the particular duty which is contemplated. Amounts of 6 to 25 per cent, for instance are suitable. I have found that by applying preformed ferrite, in accordance with the present invention, less however is needed than where the ferrite is developed in situ on the dolomite grains, and this gives a further advantageous result in that the over-all refractoriness of the product is thus not pulled down. In the customary practices involving the reaction and formation of calcium ferrite in situ on the dolomite grains, it is quite usual for manufacturers to introduce quite large amounts of iron oxide in order to hasten the reaction as much as possible, and in order to insure a large amount of calcium ferrite for the obtaining of coalescence in the ultimate refractory when placed in a furnace lining, in an acceptable feasible period of time. Obviously, after the prepared refractory has been placed in the furnace lining, the furnace man is desirous of incurring no greater delay than is compulsory for the setting and consolidating of the material, and the tendency has been for refractory manufacturers to use relatively large amounts of iron oxide, with this in view. However, this is done at the expense of ultimate refractoriness; and even with the excessive provision of iron oxide the consolidation and coalescence of the refractory lining may require an excessive length of time. It constitutes a great advantage therefore, that in accordance with the present process an amount of calcium ferrite bond may be provided in the refractory material such as to cause coalescence and consolidation of the refractory lining in a shorter time.

Lime combines with iron oxide in different proportions to form fusible products. The lime for the reaction may be any suitable lime or limestone, or lime which has been separated from dolomite, etc. The presence of some magnesium in the lime or limestone is permissible, but it should not run as high as in dolomite, as dolomite does not operate very well, for the reason that the lime having reacted, the magnesia represents an inert material. Iron oxide of convenient source may be employed, such as mill scale iron ore, etc., in range of purity consistent with the results in view. Silica in all of the materials should be low, however, and preferably not over 4 or 5 per cent. The amounts of lime and iron oxide in general for the formation of the ferrite flux may be for instance from 10 per cent CaO and 90 per cent of $Fe_2O_3$ to 45 per cent CaO and 55 $Fe_2O_3$. With the calcium ferrite formed, as above pointed out, it is then applied to the particles of the refractory material, either as a fusion of the ferrite or after having been granulated or ground.

The refractory particles coated with pre-formed calcium ferrite in this manner, are distinctive in that the ferrite is on the outside where it will be immediately available for coalescence in the furnace, instead of being largely penetrated into the grains as occurs in the old processes of in situ reaction and formation. Being coated and thus protected, dolomite refractories of this character are outstanding in their keeping properties in atmospheric exposure, and the slaking propensity is particularly controlled. And, as already indicated, the material when applied in a furnace lining has sufficient available bond to coalesce and mature with extreme rapidity, but the bond is in such condition and amount that the ultimate over-all refractoriness of the lining is relatively unimpaired by the bonding agent.

Other modes of applying the principle of the invention may be employed, change being made as regards the details described, provided the features stated in any of the following claims, or the equivalent of such, be employed.

I therefore particularly point out and distinctly claim as my invention:

1. In a process of the character described, providing dolomite grains with a permanent bond of calcium ferrite by reacting lime with iron oxide in the substantial absence of dolomite, comminuting the reaction product and mixing in small amount with the grains of dolomite.

2. In a process of the character described, providing dolomite grains with a permanent bond of calcium ferrite by forming calcium ferrite in the substantial absence of dolomite, and applying such pre-formed calcium ferrite as a coating to grains of dolomite.

3. In a process of the character described, reacting lime and iron oxide, and pouring the resultant ferrite while molten upon dolomite grains.

HARLEY C. LEE.